A. KURRUS.
Gags for Animals.

No. 158,502. Patented Jan. 5, 1875.

WITNESSES:
J. W. Herthel.
Chas. F. Meisner.

INVENTOR:
August Kurrus
per Herthel & Co
Attys.

UNITED STATES PATENT OFFICE.

AUGUST KURRUS, OF BELLEVILLE, ILLINOIS.

IMPROVEMENT IN GAGS FOR ANIMALS.

Specification forming part of Letters Patent No. 158,502, dated January 5, 1875; application filed October 14, 1874.

*To all whom it may concern:*

Be it known that I, AUGUST KURRUS, of Belleville, St. Clair county, and State of Illinois, have invented an Improved Gag for Animals, of which the following is a specification:

This invention is an improved gag for cows, goats, and domesticated animals, designed for preventing the same, or their young, from sucking the milk which it is desirable and necessary to use for dairy or household purposes. This invention relates, therefore, to the peculiar construction, operation, and use of the device, now to be more fully described.

Figure 1:
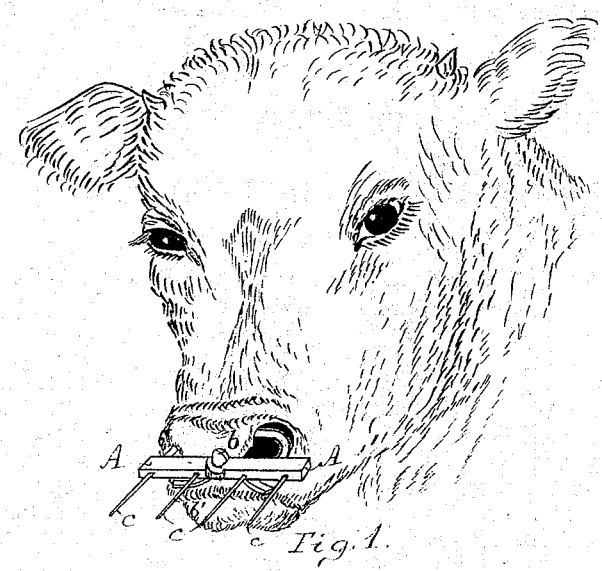
Figure 2:
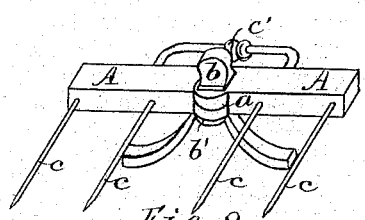
Figure 3:
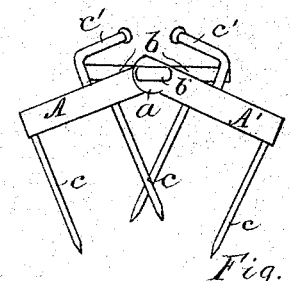
Figure 4:
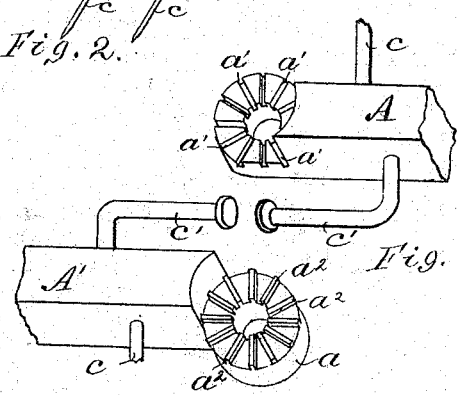

Of the drawing, Figure 1 is a perspective view of my device, showing its manner of application and use. Fig. 2 is a perspective view of the device enlarged over that of Fig. 1. Fig. 3 is a top plan, showing the device open for insertion and use; Figs. 4 5 respective perspective views of parts of my device, to show more clearly detail construction of each part.

I form two bars, A A', fitted to be journaled in the center, as indicated in the figures. The journal $a$ is a rule-joint, and, further, is formed to have cogs and corresponding grooves. Hence, as shown in Fig. 4, the bar A I provide on its journal part with the grooves $a^1$; similarly, the bar A' I provide on its journal part with cogs or teeth $a^2$, the object of the grooves $a^1$ and cogs $a^2$ being to permit the two parts A A' to be fitted and jointed to each other in varying positions, or to adapt the device to different sizes of animals. In Fig. 3 the said parts are thus jointed widely apart. When the cogs $a^2$ are inserted and placed in any of the grooves $a^1$ self-turning on part of the journal is avoided. Through the joint $a$ I also pass a set-screw, $b$, to further unite the bars A A' in firm position, as shown in Figs. 1 and 2. To the under end of the set-screw $b$ I fasten a further thumb-screw, $b'$, but having spread legs, as indicated in Figs. 1 and 2. This latter screw $b'$ not only serves as a nut to fasten the set-screw $b$, but especially forms a rest-bearing by its legs to support the device in position upon the upper lip of the mouth of the animal. (See Fig. 1.) Both the bars A A' in front have attached, or forming part of the same, the prongs or gags $c$. Also, in the rear of the bars A A' each has a hold-fast or clamp, $c'$, bent in form shown in the figures, and by means whereof the device is held fast by clamping the nostril of the animal. Rubber or flexible tips can be provided to each of the clamps $c'$, so as not to unduly impinge and wound the nostril.

To apply my improved device, it is but necessary to unscrew the set-screw $b$, which sufficiently loosens the journal $a$ that the bars can be opened as required for insertion in the nostrils. This done the device, by its clamp $c'$, is made to engage and hold fast in the nostril, (see Fig. 1,) and the journal $a$, by rescrewing the screw $b$, is thus firmly held. The device protrudes horizontally from the nostril of the animal, and, as the journal $a$ is prevented from self-loosening, it is impossible for the animal to shake or disengage the device from its hold.

What I claim is—

The combination of the bars A A', journal $a$, having grooves $a^1$ and cogs $a^2$, prongs $e$, clamps $c'$, screws $b$ $b'$, all constructed to operate as and for the purpose set forth.

In testimony of said invention I have hereunto set my hand in presence of witnesses.

AUGUST KURRUS.

Witnesses:
HERRMAN KIRCHNER,
VAL. REUTERMANN.